United States Patent [19]

Yamazaki et al.

[11] Patent Number: 5,061,184

[45] Date of Patent: Oct. 29, 1991

[54] ADHESIVE COMPOSITION FOR BIOMATERIAL USE

[75] Inventors: Noboru Yamazaki, Tokyo; Shigeaki Kuratas, Kokubunji; Toshiharu Yagi, Toyonaka; Hiroshi Inukai, Settsu, all of Japan

[73] Assignee: Daikin Industries, Ltd., Osaka, Japan

[21] Appl. No.: 479,239

[22] Filed: Feb. 12, 1990

Related U.S. Application Data

[63] Continuation of Ser. No. 276,099, Sep. 27, 1988, abandoned.

[30] Foreign Application Priority Data

Sep. 28, 1987 [JP] Japan .................................. 62-245637

[51] Int. Cl.⁵ .............................................. A61C 5/00
[52] U.S. Cl. .................................................. 433/228.1
[58] Field of Search ........................ 526/245; 366/602; 433/228.1

[56] References Cited

U.S. PATENT DOCUMENTS

| | | | |
|---|---|---|---|
| 3,520,863 | 7/1970 | Anello et al. | 526/245 |
| 4,431,787 | 2/1984 | Werber | 526/318 |
| 4,539,250 | 9/1985 | Fujii et al. | 526/245 |
| 4,547,558 | 10/1985 | Iwatsuki | 526/245 |
| 4,557,562 | 12/1985 | Ohmori et al. | 526/245 |
| 4,666,977 | 5/1987 | Kihara et al. | 526/245 |
| 4,691,045 | 9/1987 | Fukuchi et al. | 526/320 |

FOREIGN PATENT DOCUMENTS 0075191  3/1983  European Pat. Off. ............ 526/245

*Primary Examiner*—Joseph L. Schofer
*Assistant Examiner*—N. Sarofim
*Attorney, Agent, or Firm*—Armstrong, Nikaido, Marmelstein, Jubovcik & Murray

[57] ABSTRACT

In an adhesive composition for biomaterial use, a composition characterized by comprising as a main component a compound represented by the formula

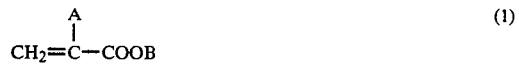

$$CH_2=\overset{A}{\underset{|}{C}}-COOB \qquad (1)$$

wherein A is H, F or CH₃, B is fluoralkyl group having 1 to 20 carbon atoms.

15 Claims, No Drawings

ADHESIVE COMPOSITION FOR BIOMATERIAL USE

This application is a continuation of application Ser. No. 276,099 filed Sept. 27, 1988 now abandoned.

The present invention relates to an adhesive composition for biomaterial use which has an excellent adhesive strength.

Recently, for example, in therapy of teeth, a composite resin is developed in place of a dental coment. The recent composite resin is stable for a long period of time, small in water absorbency and destruction and some of them are not distinguished from a natural tooth in color tone.

However, the composite resin does not adhere to a dental material such as enamel or dentine, and accordingly separates from dental material during a long term of use.

Conventionally, various adhesives have investigated which improve adhesiveness between a composite resin and a dental material. However, many of adhesives have not developed which adhere firmly to the dental material for a long time, at a circumstance which is wet and great in temperature change, because many of adhesives have problems in durability in oral cavity and operability at use.

An object of the invention is to provide an adhesive composition having an excellent adhesiveness for a long time at a circumstance such as in oral cavity which is wet and great in temperature change and receives repeated strain by mastication.

Another object of the invention is to provide an adhesive composition for bonding a bone with a biomaterial such as an artificial joint, artificial bone made of ceramic, metal or the like.

The above and other objects of the invention will become apparent from the following description.

In an adhesive composition for biomaterial use, the present invention provides a composition characterized by comprising as a main component a compound represented by the formula $$CH_2=\overset{A}{\underset{|}{C}}-COOD \qquad (1)$$

wherein A is H, F or $CH_3$, D is fluoroalkyl group having 1 to 20 carbon atoms.

IUPAC Macro '82, Amherst. July 12~16 (1982) discloses a dental repair composition comprising bisphenol A-bis-ethylene glycol dimethacrylate, octafluoropentyl methacrylate and silane-treated quartz powder, but the dental material obtained therefrom is silent about adhesiveness, although disclosed to have almost same strength and abrasion resistance as the conventional material. Further, Shika Zairyo. Kikai Vol. 2 No. 1 50-57 (1983) described a bulk polymerized polymer of 2,2,2-trifluoroethyl methacrylate (TFEMA) and methyl methacrylate (MMA), and a resin obtained by powder-liquid polymerization from poly-TFEMA (PTFEMA) as powder component and MMA as liquid component. This literature discloses about mechanical properties, etc. but is mute about adhesiveness. JP-A-62-33110 discloses a dental material comprising a polymer containing at least 40% by weight of a structure unit of the formula $$-CH_2-\overset{F}{\underset{\underset{COOR}{|}}{C}}- \qquad (3)$$

wherein R is aliphatic group having 1 to 5 carbon atoms. This polymer is disclosed to be suitable as a dental material such as denture base but nothing about adhesiveness of the polymer is described.

In the present invention, the substituent D of the formula (1) is fluoroalkyl group having 1 to 20, preferably 1 to 10 carbon atoms. Examples of the compound of the formula (1) are trifluoroethyl methacrylate (3FMA), tetrafluoropropyl methacrylate (4FMA), pentafluoropropyl methacrylate (5FMA), octafluoropentyl methacrylate (8FMA), heptadecafluorononyl methacrylate (17FMA), trifluoroethyl α-fluoroacrylate (3FFA), tetrafluoropropyl α-fluoroacrylate (4FFA), pentafluoropropyl α-fluoroacrylate (5FFA), octafluoropentyl α-fluoroacrylate (8FFA) and heptadecafluorononyl α-fluoroacrylate (17FFA). These are used singly or as a mixture of at least two of them. The compound of the formula (1) is used in the form of a monomer and/or a polymer thereof, or conjointly with an other copolymerizable compound.

Preferable examples of the other copolymerizable compounds are acrylic acid, methacrylic acid, α-fluoroacrylic acid and esters of these acids. As esters of (meth)acrylic acid and α-fluoroacrylic acid are preferable esters having alkyl of 1 to 20 carbon atoms and esters with a polyalcohol.

Examples of alkyl esters of (meth)acrylic acid are methyl (meth)acrylate, ethyl (meth)acrylate, butyl (meth)acrylate, octyl (meth)acrylate, dodecyl (meth)acrylate and hexadecyl (meth)acrylate. Examples of alkyl esters of α-fluoroacrylic acid are methyl α-fluoroacrylate, ethyl α-fluoroacrylate, butyl α-fluoroacrylate, octyl α-fluoroacrylate, dodecyl α-fluoroacrylate and hexadecyl α-fluoroacrylate.

Examples of polyalcohols are trimethylolpropane, polymethylene (or ethylene) glycol of the formula HO—(CH$_2$)n—OH, n:1 to 5, and compounds of the formulae

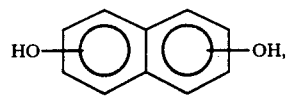

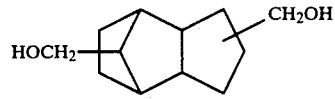

As an other copolymerizable compound can be used urethane methacrylate represented by the formula

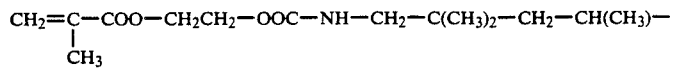

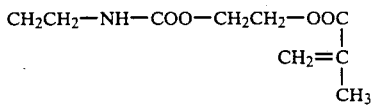

These copolymerizable compounds can be used together with the compound of the formula (1) in the form of a monomer and/or a polymer thereof.

As a more preferable embodiment, the present invention provides an adhesive composition which comprises the compound of the formula (1) in the form of (a) and (b), (a) a polymer obtained by polymerizing, as a part or whole of monomers, at least one compound selected from the group consisting of a compound of the formula $$CH_2=\overset{A}{\underset{|}{C}}-COOE, \text{ and} \qquad (2)$$

an ester of a polyalcohol and a compound of the formula $$CH_2=\overset{A}{\underset{|}{C}}-COOH$$

wherein A is H, F or $CH_3$, E is $C_{1\sim20}$ alkyl group or $C_{1\sim20}$ fluoroalkyl group, (b) a monomer which is at least one compound selected from the group consisting of a compound of the formula $$CH_2=\overset{A}{\underset{|}{C}}-COOE, \text{ and} \qquad (2)$$

an ester of a polyalcohol and a compound of the formula $$CH_2=\overset{A}{\underset{|}{C}}-COOH$$

wherein A and E are same as above, provided that at least one of (a) component and (b) component contains $C_{1\sim20}$ fluoroalkyl group.

The polymer of (a) component can be prepared by homopolymerizing a monomer of the formula $CH_2=C(A)COOD$, A and D are same as above, or by copolymerizing at least 10% and less than 100% by weight of the above monomer and up to 90% by weight of an other copolymerizable monomer. The copolymerizable monomer includes the above copolymerizable compound for the compound of the formula (1), such as (meth)acrylic acid, α-fluoroacrylic acid, alkyl ester or polyalcohol ester of these acids, and the above-mentioned urethane methacrylate.

As a monomer of the formula (2) are used the compounds enumerated in the above compound of the formula (1), and methyl (meth)acrylate, ethyl (meth)acrylate, butyl (meth)acrylate, octyl (meth)acrylate, dodecyl (meth)acrylate, hexadecyl (meth)acrylate, methyl α-fluoroacrylate, ethyl α-fluoroacrylate, butyl α-fluoroacrylate, octyl α-fluoroacrylate, dodecyl α-fluoroacrylate and hexadecyl α-fluoroacrylate. These compounds can be used singly or as a mixture of at least two of them.

In the present invention, an adhesive reactive monomer can be used as required. The monomer includes a compound having hydroxyl group (—OH), carboxyl group (—COOH), phosphoric acid group (—$PO_4H_2$), mercapto group (—SH), sulfonic acid group (—$SO_3H$), cyano group (—CN), isocyanato group (—NCO), etc. Examples thereof are N-(2-hydroxy-3-methacryloxypropyl)-N-phenylglycine (NPG-GMA), methacryloxyethyl phthalate, N-methacrylyl-N'-carboxymethyl piperazine (N1), N-methacrylyl-N,N'-dicarboxymethyl p-phenylenediamine (N2), 4-methacryloxyethyl trimellitic acid (4-MET), 4-methacryloxyethyl trimellitic acid anhydride (4-META), methacryloxyethyl phosphate, N-(4-mercaptophenyl)methacrylamide and N-O-dimethacryloyl tyrosine. These compounds can be used singly or as a mixture of at least two of them. The adhesive reactive monomer is used preferably in an amount of 1 to 20% by weight based on the total amount of the monomers.

The polymer of the compound of the formula (1) of the present invention, or copolymer thereof with an other copolymerizable compound can be prepared by polymerizing the above monomers by a method used in the polymerization of an ethylenically unsaturated monomer, preferably in the presence of a radical producing source. In order to produce a radical, a polymerization initiator is added to a monomer or ultraviolet ray or visible ray is irradiated to a monomer.

A polymerization initiator is usually used which decomposes at around room temperature to produce a radical. Examples of polymerization initiators are tri-n-butyl-borane (TBB) and like metal alkylates which react with oxygen to form a radical, peroxides (benzoyl peroxide, acetyl peroxide, lauroyl peroxide, cumene hydroperoxide, methyl ethyl ketone peroxide, t-butyl peroxybenzoate, etc.) and a combination of the peroxide and an accelerator (tertiary amine, cobalt naphthenate or octenoate, transition metal ion, amine salt of p-toluenesulfonic acid or sulfinic acid, etc.). The above respective polymerization initiator and accelerator is used preferably in an amount of about 0.1 to 2.5 parts by weight per 100 parts by weight of total amount of the monomers.

In case of the polymerization with the irradiation of ultraviolet ray or visible ray, a photosensitizer is usually used. In the irradiation of ultraviolet ray, benzophenone, nitrofluorene, 5-nitroacenaphthene or the like can be used, and in the irradiation of visible ray, camphorquinone or the like can be used.

The polymer of the present invention having a structural unit of the formula (1) is excellent, for example, particularly in dimensional stability and non-water-absorbency. The above-mentioned JP-A-62-33110 discloses a homopolymer having a structural unit of the formula (3), and a copolymer of the monomer of the formula (3) and a monomer represented by the formula $$CH_2=C(F)COOR^1$$

or $$CH_2=C(R^2)COOR^1$$

wherein $R^1$ is fluorine-containing aliphatic group having 1 to 5 carbon atoms, $R^2$ is hydrogen atom or methyl. The present polymer is much more excellent in dimensional stability and non-water-absorbency than the polymer of JP-A-62-33110 as shown in Comparison Example 2 later, hence is more useful.

The present invention will be described by showing Examples, Comparison Examples and Reference Examples, in which part or parts is by weight.

EXAMPLES 1 TO 10

To 100 parts of a fluorine-containing acrylate listed in Table 1 was added 0.5 part of benzoyl peroxide with sufficient stirring. The mixture was placed into a glass tube having a diameter of 4 mm, 6 mm or 10 mm and each of them was maintained at 55° C. for 24 hours and then at 100° C. for 15 hours to obtain polymers of fluorine-containing acrylate.

The obtained polymers were checked for their properties by the following methods and were confirmed to be suitable for biomaterial. The results were given in Table 1.

(1) Critical surface tension γc[dyn/cm]
The polymer was formed into a sheet of 3 mm thick and wet angle was measured with use of various solvents to determine critical surface tension.

(2) Hardness
Hardness was measured by use of Rockwell hardness tester M-scale (load 60 kg).
Test piece: a sheet of 3 mm thick (3) Tensile strength TS[kg/cm$^2$]
TS was measured by tensile testing machine at a crosshead speed of 3.0 mm/min.
Test piece: 45 mm × 5 mm × 0.5 mm (length × width × thickness)

(4) Water absorbency [%]
A test piece, same as in (3), was dried at 50° C. for 24 hours and then immersed in water at 23° C. for 24 hours. The weight gain was measured.

(5) Dimensional stability [%]
In the above (4), change in length of the test piece was measured to determine dimensional stability.

COMPARISON EXAMPLES 1 AND 2

Two kinds of polymers were obtained in the same manner as in Example 1 except that methyl methacrylate (MMA) or methyl α-fluoroacrylate (MFA) was used as a monomer. Table 1 also shows properties of the obtained polymers.

EXAMPLE 11

An adhesive composition was prepared by mixing 0.1 g of poly(methyl methacrylate) (PMMA) powder 5 mg of 4-methacryloxyethyl trimellitic acid anhydride (4-META), 0.076 g of MMA, 0.019 g of 3FMA and 0.007 g of tri-n-butylborane (TBB). Two stainless steel rods adhered at their edges with use of the above adhesive composition. After immersed in water at 37° C. for 45 days, tensile strength was 56 kgf/cm$^2$.

EXAMPLE 12

An adhesive composition was prepared in the same manner as in Example 11 except that MMA was used in 0.057 g in place of 0.076 g and 3FMA was used in 0.038 g in place of 0.019 g. The adhesive test was similarly conducted and tensile strength was 76 kgf/cm$^2$.

EXAMPLE 13

An adhesive composition was prepared by mixing 0.1 g of poly(trifluoroethyl methacrylate) (P3FMA), 5 mg of 4-META, 0.095 g of MMA and 0.007 g of TBB. Two stainless steel rods adhered at their edges with use of the above adhesive composition. After immersed in water at 37° C. for 45 days, tensile strength was 141 kgf/cm$^2$.

EXAMPLE 14

An adhesive composition was prepared in the same manner as in Example 13 except that MMA(0.055 g) and 3FMA (0.0408 g) were used in place of MMA(0.095 g). The adhesive test was similarly conducted and tensile strength was 64 kgf/cm$^2$.

COMPARISON EXAMPLE 3

An adhesive composition was prepared in the same manner as in Example 11 except that 0.095 g of MMA was used and 3FMA was not used. The adhesive test was similarly conducted and tensile strength was 45 kgf/cm$^2$.

COMPARISON EXAMPLE 4

An adhesive composition was prepared by mixing 0.1 g of PMMA powder, 0.1 g of MMA and 0.007 g of TBB. A dentine of cow tooth adhered to a metal (SUS 304) with use of the above adhesive composition. After immersed in water at 37° C. for 50 days, tensile strength was 12 kgf/cm$^2$.

REFERENCE EXAMPLE 1

Four kinds of copolymers were obtained from 3F FA and MMA in the ratio (weight %) listed in Table 2. Test pieces (10φ × 1 mm) of each copolymers were immersed

TABLE 1

| | Monomer | A | B | Specific gravity | Refractive index No | Critical surface tension | Hardness | Tensile strength | Water absorbency (%) | Dimensional stability (%) |
|---|---|---|---|---|---|---|---|---|---|---|
| Com. Ex. 1 | MMA | CH$_3$ | CH$_3$ | 1.1903 | 1.4900 | 24.4 | 90 | 630 | 2.0 | 0.2 |
| Ex. 1 | 3FMA | CH$_3$ | CH$_2$CF$_3$ | 1.4351 | 1.4146 | 18.3 | 47 | 283 | 0.09 | 0.1 |
| 2 | 4FMA | CH$_3$ | CH$_2$CF$_2$CF$_2$H | 1.4960 | 1.4215 | 20.4 | 97 | — | 0.16 | 0.03 |
| 3 | 5FMA | CH$_3$ | CH$_2$CF$_2$CF$_3$ | 1.5204 | 1.3920 | 17.0 | 31 | 254 | 0.08 | 0.03 |
| 4 | 8FMA | CH$_3$ | CH$_2$(CF$_2$)$_4$H | 1.6382 | 1.3928 | 17.5 | — | — | — | — |
| 5 | 17FMA | CH$_3$ | CH$_2$(CF$_2$)$_8$F | 1.7427 | 1.3732 | 10.8 | — | — | — | — |
| Com. Ex. 2 | MFA | F | CH$_3$ | 1.4010 | 1.4570 | 20.0 | 95 | 717 | 3.1 | 0.5 |
| Ex. 6 | 3FFA | F | CH$_2$CF$_3$ | 1.5868 | 1.3856 | 15.0 | 62 | 358 | 0.1 | 0 |
| 7 | 4FFA | F | CH$_2$CF$_2$CF$_2$H | 1.6447 | 1.3973 | 19.0 | 90 | 266 | 0 | 0 |
| 8 | 5FFA | F | CH$_2$CF$_2$CF$_3$ | 1.6540 | 1.3664 | 12.0 | 75 | 286 | 0 | 0 |
| 9 | 8FFA | F | CH$_2$(CF$_2$)$_4$H | 1.7588 | 1.3755 | 15.8 | 16 | — | 0 | 0 |
| 10 | 17FFA | F | CH$_2$(CF$_2$)$_8$F | — | — | <10 | — | — | 0 | 0 | in water at 37° C. for 7 days according to American Dental Association (ADA) standard and water absorption (mg/cm$^2$) was measured. The results were shown in Table 2.

TABLE 2

| No. | 3FFA/MMA (wt. %) | Water absorption (mg/cm$^2$) |
|---|---|---|
| 1 | 70/30 | 0.2 |
| 2 | 50/50 | 0.4 |
| 3 | 30/70 | 0.6 |
| 4 | 0/100 | 1.1 |

EXAMPLES 15 TO 18

Adhesive compositions were prepared by mixing 0.1 g of P3FMA powder, 0.005 g of 4-META, 0.095 g of a monomer listed in Table 3 and 0.007 g of TBB. A cow tooth adhered to a metal (SUS 304) with use of the above adhesive composition. After immersed in water at 37° C. for a period shown in Table 3, tensile strength (kgf/cm$^2$) was measured 5 times. Table 3 gives an average value thereof. Each of the adhesive compositions adheres excellently to the tooth and the adhesive composition separates from the metal. Thus, the tensile strength between the adhesive composition and the tooth is greater than the value shown in Table 3.

COMPARISON EXAMPLE 5

An adhesive composition was prepared in the same manner as in Example 15 except that 0.1 g of PMMA powder, 0.005 g of 4-META, 0.095 g of MMA and 0.007 g of TBB were used. The adhesive test was similarly conducted and the results were shown in Table 3.

TABLE 3

|  | Monomer | Enamel |  | Dentine |  |
|---|---|---|---|---|---|
|  |  | 2 days | 15 days | 2 days | 15 days |
| Ex. 15 | MMA | 172 | 143 | 79 | 76 |
| 16 | MFA | 139 | 126 | 107 | 135 |
| 17 | 3FFA | 134 | 98 | 98 | 76 |
| 18 | 3FMA | 146 | 86 | 74 | 78 |
| Com. Ex. 5 | MMA | 197 | 138 | 100 | 87 |

EXAMPLES 19 TO 22

Adhesive compositions were prepared in the same manner as in Example 15 except that 0.1 g of P3FMA powder, 0.005 g of 4-META, 0.095 g of a monomer listed in Table 4 and 0.007 g of TBB were used. The adhesive test was similarly conducted and the results were shown in Table 4. Each of the adhesive compositions adheres excellently to the tooth and the adhesive composition separates from the metal. Thus, the tensile strength between the adhesive composition and the tooth is greater than the value shown in Table 4.

TABLE 4

| Monomer mixture (weight ratio) | Enamel |  | Dentine |  |
|---|---|---|---|---|
|  | 2 days | 15 days | 2 days | 15 days |
| Ex. 19 MMA/3FFA(7:3) | 173 | 136 | 103 | 73 |
| 20 MFA/3FFA(7:3) | 167$^{(a)}$ | 114 | 109 | 135 |
| 21 MMA/MFA/3FFA (4:3:3) | 176 | 113 | 100 | 87 |
| 22 MMA/MFA(7:3) | 202 | 154 | 166 | 105 |

Note
$^{(a)}$cohesive failure

An adhesive composition for biomaterial use of the present invention has an excellent adhesiveness for a long time at a circumstance such as in oral cavity which is wet and great in temperature change and receives repeated strain by mastication. Conventional adhesive compositions using MMA do not have sufficient effect as an adhesive composition for dentine and lack particularly durability in water for a long term. When MMA is replaced by the compound of the formula (1), particularly by the compound (1) and MFA, a surprisingly excellent wet durability is obtained in which not only the initial adhesiveness is increased but also the adhesiveness hardly changes for a long period of time.

The present adhesive composition exhibits an excellent adhesiveness for a long period of time also in the adhesion with enamel, compared with the adhesive composition of Comparison Example 5. The present adhesive composition is extremely advantageous in view of dental clinic since excellent adhesiveness is obtained in the adhesion with both of enamel and dentine.

Further, the present adhesive composition is useful for bonding a bone with a biomaterial such as an artificial joint, artificial bone made of ceramic, metal or the like.

We claim:

1. A method of adhering a dental material for use in any oral cavity comprising as a main component a compound represented by the formula

wherein A is H, F, or CH$_3$, and D is a fluoroalkyl group having 1 to 20 carbon atoms.

2. A method of adhesion according to claim 1 which comprises the compound of the formula (1) in the form of a monomer and/or a polymer thereof.

3. A method of adhesion according to claim 1 which mainly comprises the compound of the formula (1) and an other copolymerizable compound.

4. A method of adhesion according to claim 3 wherein the other copolymerizable compound is acrylic acid, methacrylic acid or an ester thereof.

5. A method of adhesion according to claim 4 wherein the acrylic or methacrylic ester is C$_{1\sim20}$ alkyl ester thereof, or polyethylene glycol di(meth)acrylate, trimethylolpropane tri(meth)acrylate or like ester of polyethylene glycol, trimethylolpropane or like polyalcohol.

6. A method of adhesion according to claim 3 wherein the other copolymerizable compound is α-fluoroacrylic acid or an ester thereof.

7. A method of adhesion according to claim 6, wherein the α-fluoroacrylic ester is selected from the group consisting of C$_{1\sim20}$ alkyl esters thereof, polyethylene glycol di-α-fluoroacrylate, trimethylolpropane tri-α-fluorocrylate, the polyethylene glycol derivative thereof, trimethylolpropane and homologous polyalcohols.

8. A method of adhesion according to claim 7 wherein the other copolymerizable compound is methyl α-fluoroacrylate.

9. A method of adhesion according to claim 3 which comprises each of the compound of the formula (1) and the other copolymerizable compound in the form of a monomer and/or a polymer thereof.

10. A method of adhesion according to claim 1 which comprises the compound of the formula (1) in the form of (a) and (b), (a) a polymer obtained by polymerizing, as a part or whole of monomers, at least one compound selected from the group consisting of a compound of the formula

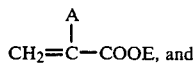 (2)

an ester of a polyalcohol and a compound of the formula

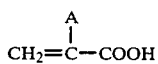

wherein A is H, F or $CH_3$, E is $C_{1\sim 20}$ alkyl group or $C_{1\sim 20}$ fluoroalkyl group, (b) a monomer which is at least one compound selected from the group consisting of a compound of the formula

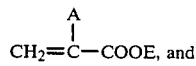 (2)

an ester of a polyalcohol and a compound of the formula

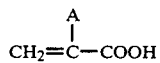

wherein A and E are same as above, provided that at least one of (a) component and (b) component contains $C_{1\sim 20}$ fluoroalkyl group.

11. A method of adhesion according to any of claims 1 to 10 which further contains an adhesive reactive monomer.

12. A method of adhesion according to claim 11 wherein the adhesive reactive monomer is 4-methacryloxyethyl trimellitic acid or an anhydride thereof.

13. A method of adhesion according to any of claims 1 to 10 which further contains a radical producing source.

14. A method according to claim 1 wherein the material is selected from the group consisting of dental material, bone artificial joint, and artificial bone constructed from made of ceramic, metal or the like.

15. A method as defined in claim 14 wherein the dental material is enamel or dentin.

* * * * *

UNITED STATES PATENT AND TRADEMARK OFFICE
CERTIFICATE OF CORRECTION

PATENT NO.  : 5,061,184
DATED       : October 29, 1991
INVENTOR(S) : YAMAZAKI, et al It is certified that error appears in the above-identified patent and that said Letters Patent is hereby corrected as shown below:

On the title page, Item [75] change the name of the second inventor from "SHIGEAKI KURATAS" to --SHIGEAKI KURATA--.

Signed and Sealed this

Twenty-third Day of November, 1993

Attest:

BRUCE LEHMAN

Attesting Officer

Commissioner of Patents and Trademarks